United States Patent
Truty

(10) Patent No.: US 7,386,592 B2
(45) Date of Patent: Jun. 10, 2008

(54) METHOD AND SYSTEM FOR MERGING TOPICALLY RELATED E-MAIL IN A COLLABORATIVE WORK ENVIRONMENT

(75) Inventor: Gregory Louis Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 10/626,183

(22) Filed: Jul. 24, 2003

(65) Prior Publication Data

US 2005/0038854 A1    Feb. 17, 2005

(51) Int. Cl.
G06F 15/16    (2006.01)

(52) U.S. Cl. .................. 709/206; 709/207; 709/217; 709/219; 715/752

(58) Field of Classification Search ............... 709/206, 709/207, 217, 219; 715/752
See application file for complete search history.

(56) References Cited

U.S. PATENT DOCUMENTS

| | | | | |
|---|---|---|---|---|
| 5,958,006 A | * | 9/1999 | Eggleston et al. | 709/219 |
| 5,995,597 A | * | 11/1999 | Woltz et al. | 379/93.24 |
| 6,792,448 B1 | * | 9/2004 | Smith | 709/204 |
| 6,820,081 B1 | * | 11/2004 | Kawai et al. | 707/7 |
| 2002/0073157 A1 | * | 6/2002 | Newman et al. | 709/206 |
| 2004/0044735 A1 | * | 3/2004 | Hoblit | 709/206 |
| 2004/0083432 A1 | * | 4/2004 | Kawamura et al. | 715/526 |
| 2004/0119740 A1 | * | 6/2004 | Chang et al. | 345/751 |
| 2004/0221295 A1 | * | 11/2004 | Kawai et al. | 719/313 |
| 2005/0057584 A1 | * | 3/2005 | Gruen et al. | 345/752 |

* cited by examiner

*Primary Examiner*—Liang-Che Alex Wang
(74) *Attorney, Agent, or Firm*—Justin M. Dillon; Winstead, P.C.

(57) ABSTRACT

A mechanism is presented for merging e-mail messages into a collated file. An e-mail message and its associated responses may be accessed and collated based on a selected pattern for responses. The set of e-mails may be collated into a single document with the responses associated with the particular message to which the response is directed. Using pattern matching operations in an iterative fashion, a response may be associated with the message that elicited the response whether the original message or a previous response. The form of association may be user selectable.

3 Claims, 4 Drawing Sheets

METHOD AND SYSTEM FOR MERGING TOPICALLY RELATED E-MAIL IN A COLLABORATIVE WORK ENVIRONMENT

TECHNICAL FIELD

The present invention is related in general to data processing systems, and in particular to mechanisms in data processing systems for merging a set of electronic mail (e-mail) in a collaborative work environment, that is, in an environment in which several people collaboratively contribute to an integrated work product, such as software.

BACKGROUND INFORMATION

Collaborative work environments, particularly with respect to collaborative software development, are becoming more commonplace. In such environments, teams of developers work together to produce a common work product for solving a complex problem. Often, the collaborative effort may include contributors in diverse locations, which may be geographically dispersed.

While tools are available to facilitate such collaborative work environments they have drawbacks. For example, a collaborative software development may use a "team room" concept in which a single document is maintained in which each of the collaborators inserts his or her changes. In this scheme, one collaborator must be responsible to merge all of the changes to be made. Alternatively, the document may be locked so that only one contributor can access the document at a time. Other software, WebRevue, for example, allow collaborators to comment on a document; however, it requires users to go to an external site and view the document using a browser. Discussion databases can be replicated for off-line viewing, but these have a thread model similar to the familiar Usenet Newsgroups. Thus, it may be difficult to find particular information in the database. Consequently, ordinary e-mail is commonly used to exchange information in a collaborative environment.

Nevertheless, such e-mail may rapidly accumulate as a fragmented set of comments and contributions. Consequently, there is a need in the art for mechanisms to merge topically-related e-mail and to thereby allow it to be viewed as one file with contributions from multiple users embedded in the single document. Additionally, there is a further need for mechanisms to embed the contributions in their appropriate locations within the document.

SUMMARY OF THE INVENTION

The aforementioned needs are addressed by the present invention. Accordingly, there is provided in one embodiment A method for collating e-mail messages. The method includes differencing at least one first e-mail message and a second e-mail message in which the at least one first e-mail message is prior to said second e-mail message. The differencing generates a set of unmatched text and a set of matched text. The set of matched text is further matched against a collated message file. This matching step identifies a position in the collated message file at an end of a portion of thereof corresponding to the set of matched text. The set of unmatched text is inserted in the collated message file at the position. Additionally, in another embodiment of the present invention, a user-configurable identifier is added to the text inserted into the collated mail file.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
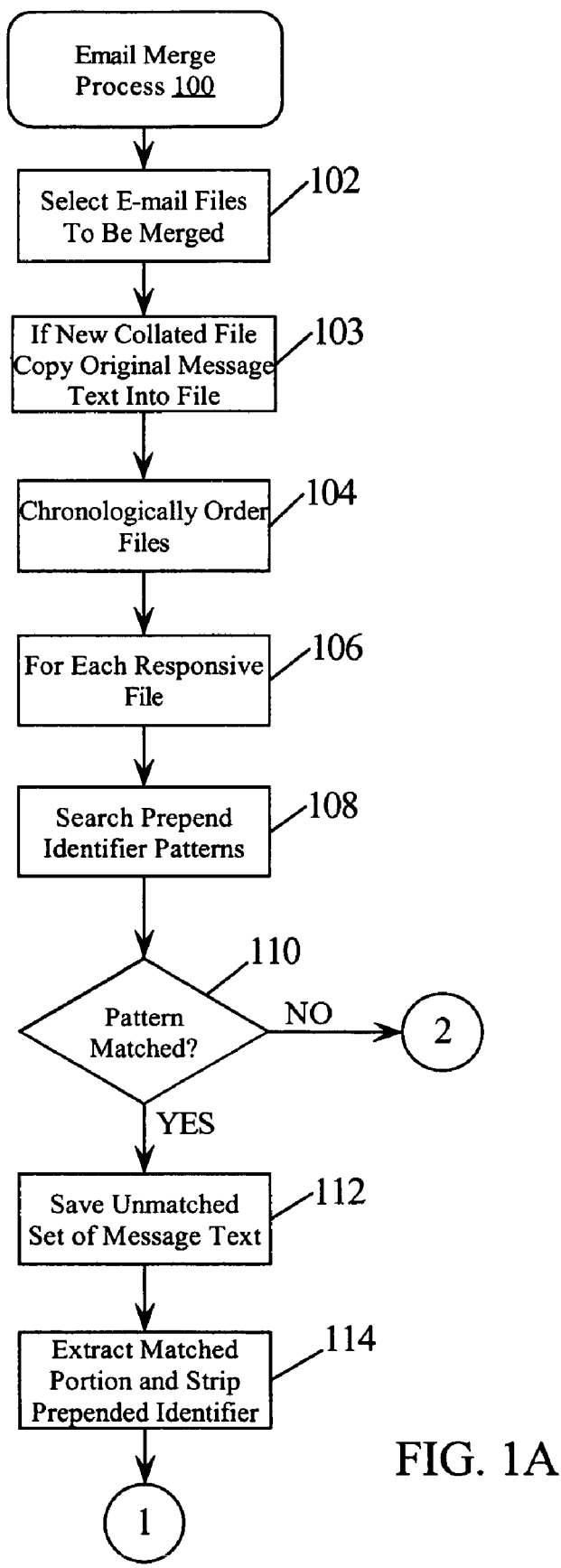
FIGS. 1A-1C illustrate, in flowchart form, a methodology for merging e-mail messages and responses in accordance with an embodiment of the present invention.

A mechanism is presented for merging e-mail messages into a collated file. An e-mail message and its associated responses may be accessed and collated based on a selected pattern for responses. The set of e-mails may be collated into a single document with the responses associated with the particular message to which the response is directed. That is, a response may be associated with the message that elicited the response whether the original message or a previous response. The form of association may be user selectable.

In the following description, numerous specific details are set forth such as particular tag formats, etc., to provide a thorough understanding of the present invention. However, it will be recognized by those of ordinary skill in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Refer now to the drawings wherein depicted elements are not necessarily shown to scale and wherein like or similar views are designated by the same reference numeral through the several views.

Figure 1B:
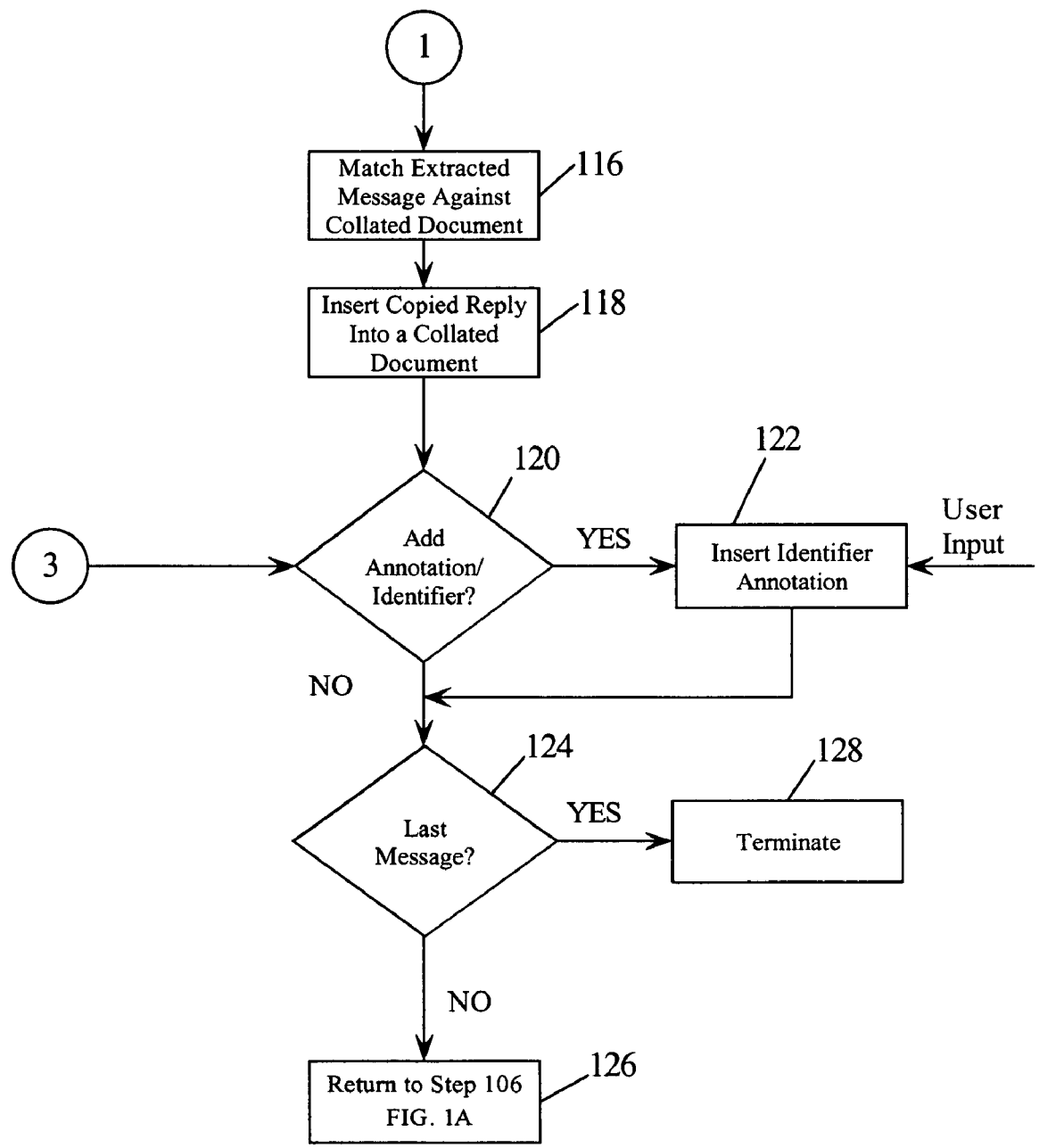
Figure 1C:
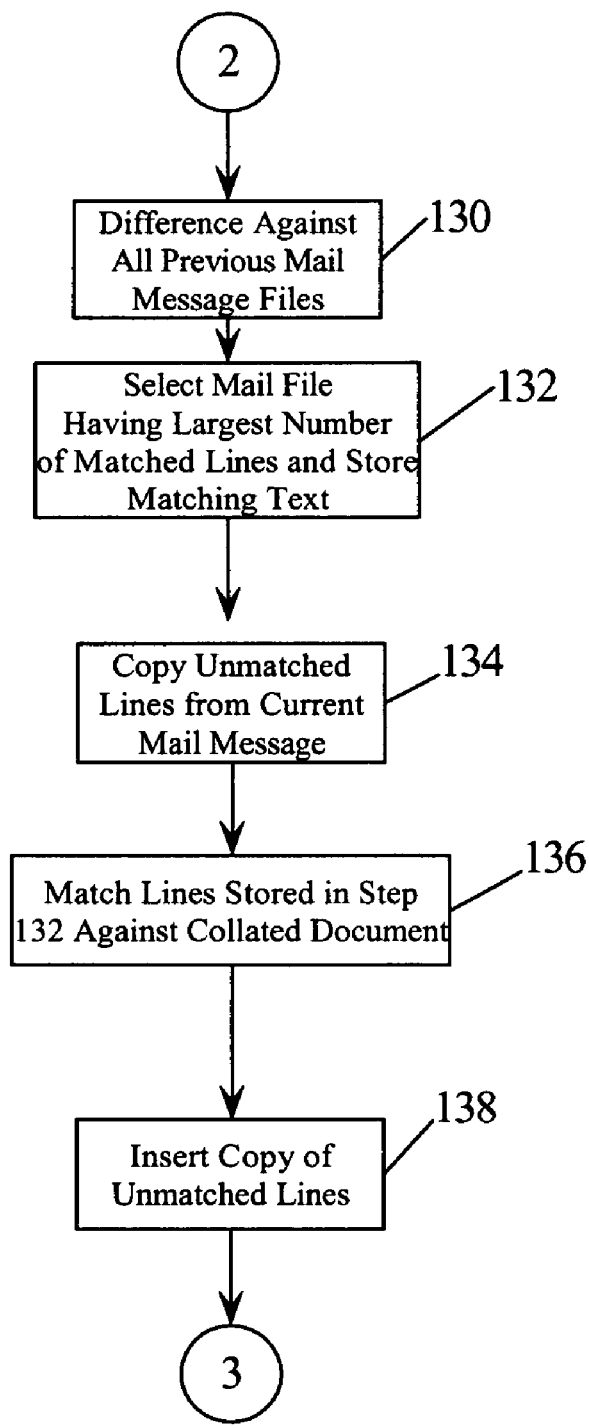

FIGS. 1A-1C illustrate, in flowchart form, a process 100 for merging e-mails in a collaborative work environment in accordance with an embodiment of the present invention. The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operation available to collate topically-related e-mail messages. It is further noted that the order presented is illustrative and does not necessarily imply that the steps must be performed in order shown.

In step 102, a set of files to be merged is selected. The selection may be based on user input identifying an original message by, for example, specifying a subject as set in the original subject line, and selected files having the same subject line with one of a predetermined set of prepended subject identifiers. Typically, such a set would include "Re:", "Fw:", typical of the identifiers prepended to the subject line when a user responds by selecting a "Reply" button or "Forward" button respectively. Note that the foregoing are exemplary and the present inventive principles may be applied to any such prepended subject identifiers used in the art. Typically, the subject identifiers, along with the subject are found in the header of the e-mail message, in accordance with RFC822, the Internet e-mail standard. RFC822-compliant-header parsers are available in programming languages such as Java and Perl.

If a new collated file is being generated, in step 103, the original message text is copied into the file. Methods for writing text to a file are provided in commonly used programming languages, for example the FileWriter( ) method in Java.

In step 104, the selected files are chronologically ordered. Note that in a collaborative environment, the exchange of e-mail messages may take place across a multiplicity of time zones. Thus, in determining a chronological ordering, data-time stamp information may be normalized to a standard time fiducial, such as Universal Coordinated Time (UTC). RFC3339 defines a standard for timestamps on the Internet. (RFCs are Internet documents which are used to promulgate Internet standards; RFCs are available from the Internet Engineering Task Force (http://www.ietf.org).) RFC3339 specifies that local time be specified with a signed offset (+/−) from UTC (Coordinated Universal Time, formerly known as Greenwich Mean Time, or GMT). Note that RFC2822, a proposed Internet standard for e-mail messages to supercede RFC822, the present standard, adopts the offset from UTC format for timestamps in e-mail headers. E-mail that conforms to RFC2822 may be normalized by subtracting the offset from the local timestamp. Alternatively, e-mail not conforming to RFC2822 may be normalized by using either the three-letter zone designation ("GMT", "EST", "EDT", "CST" etc.) and the defined offsets of these from UTC.

In step 106, a loop over each of the files selected to be merged is entered. In step 108, a search over a set of prepended identifiers is performed. One scheme used by e-mail programs when responding to a document is to prepend an identifier to the beginning of the lines of the original message. This permits users to add their responses in line, with the original text identified by the prepended identifier or symbol. For purposes herein, a symbol may refer to any non-alphabetical or numeric character. A commonly used identifier is the "right angle bracket" (>). Additionally, in such an implementation of e-mail programs, a sequence of responses denote the respective insertions with repetitions of the prepended identifier, typically with the number of symbols in the prepended identifier increasing with the "age" of the corresponding communication. In other words, a message that yields a series of replies may be identified from most recent to least recent (i.e., the original message) by an increasing number of repeats of the prepended symbol, the most recent response having no prepended identifier.

Prepended identifiers may be compared with the set using pattern matching techniques. Pattern matching mechanisms which may be used are available as standard operating system (equivalently, platform) shell commands. For example, the grep program available on Unix and Unix-like platforms, such as Linux, is a pattern matching program based on regular expressions. A regular expression is a string comprised of a sequence of text and special characters that represents a pattern to be matched. Many modern programming languages such as Perl and Java (Java 2 Platform, Standard Edition, version 1.4) include regular expression engines. These general purpose languages are available across platforms including Windows, Unix and MacOS and thus provide effectively platform-independent pattern matching functionality.

If, in step 110, a pattern match is found, then the current e-mail file includes a response to the message having the matched prepended identifier. In step 112, the response, which has no prepended identifier, is saved (for subsequent insertion into the collated document). That is, the unmatched set of message text is saved. Note that in a regular-expression-based pattern matching mechanism, the matched pattern may be defined to include the prepended identifier to be searched for followed by an arbitrary text string. In this way, the entire message to which the reply is directed may be selected. Additionally, it would be appreciated by those of ordinary skill in the art that a regular expression based match may selectively output the unmatched text. This may facilitate the retrieval of the reply in step 112, for example.

In step 114, the matched message is extracted and the prepended identifier stripped from the text. Again, regular-expression-based matching may facilitate this (using for example, the split method of the Java Pattern class). In step 116, the extracted message, from step 114, is matched against the collated document, to locate the message in the collated document. In step 118, the copied reply (i.e., of unmatched test, step 112) is inserted into the collated document at a position determined by the matching step 116. In this way, the reply to a message is concatenated with the message that elicited the reply.

In step 120, it is determined if an annotation or other identifier is to be associated with the inserted reply. Such identifiers and/or annotations may include a preselected color, font (i.e., change in font) or tags. For example a tag may be an index number in between left and right "angle" brackets (for example "<1>" prepended to the beginning of the asserted reply and a similar "end" tag "</1>" appended to the inserted text.) Alternatively, such a tag may include the responder's initials or similar mnemonic device associated with the responder. Annotations may, for example, include a footnote pointing back to a table stating where the response originated. In step 122, an identifier for annotations is inserted. The option of inserting annotation/identifiers, in step 120, and the type of identifier may be selected in response to user input. User input may be received in a graphical user interface (GUI) system using dialog boxes or similar windowing schemes. In a command line interface (CLI), command line parameters may be used for specifying user selections, for example. These techniques, in the respective GUI and CLI environments, would be understood by those of ordinary skill in the art. If, in step 120, annotations/identifiers are not selected, step 122 is bypassed.

In step 124, it is determined if the last message has been processed. If not, process 100 returns to step 106, step 126. Otherwise, the process terminates in step 128.

Returning to step 110, if no pattern in the set of prepended identifiers is matched, the current responsive file is differenced against all previous mail message files, that is, files having earlier time stamps, step 130. Similarly to the previous matching operations, the differencing in step 130 may be performed in an embodiment of process 100 using a pattern matching technique such as a regular expression matching. The text in the current message provides the regular expression string which forms the pattern to be matched.

The text in the prior message provides the regular expression string which forms the pattern to be matched.

In step 132, the prior mail message file having the largest number of matched lines from step 130 is identified and selected for further processing. In step 134, the unmatched lines are copied from the current message, that is the message being collated. In other words, the unmatched text is temporarily stored, for example by assignment to a string variable, for subsequent insertion into the collated file, as described below. In Java, for example, a StringBuffer object may be used.

In step 136, the matched lines stored in step 132 are matched against the collated document to identify the position in the collated document for the insertion of the unmatched lines copied in step 134. In step 138, the copy of the unmatched lines is inserted into the collated document, and process 100 proceeds to step 120. Identifiers and annotations may be selectively inserted in steps 120 and 122 as previously discussed. Process 100 then continues to insert responses from the remaining messages in the set of files selected to be merged (in step 102) via steps 124-128 as discussed hereinabove.

In this way, a collated document including messages and their responses in a set of topically related email may be generated. Additionally, annotations or identifiers tagging the messages to illustrate the relations between messages and their respective replies may be selectively inserted.

Figure 2:
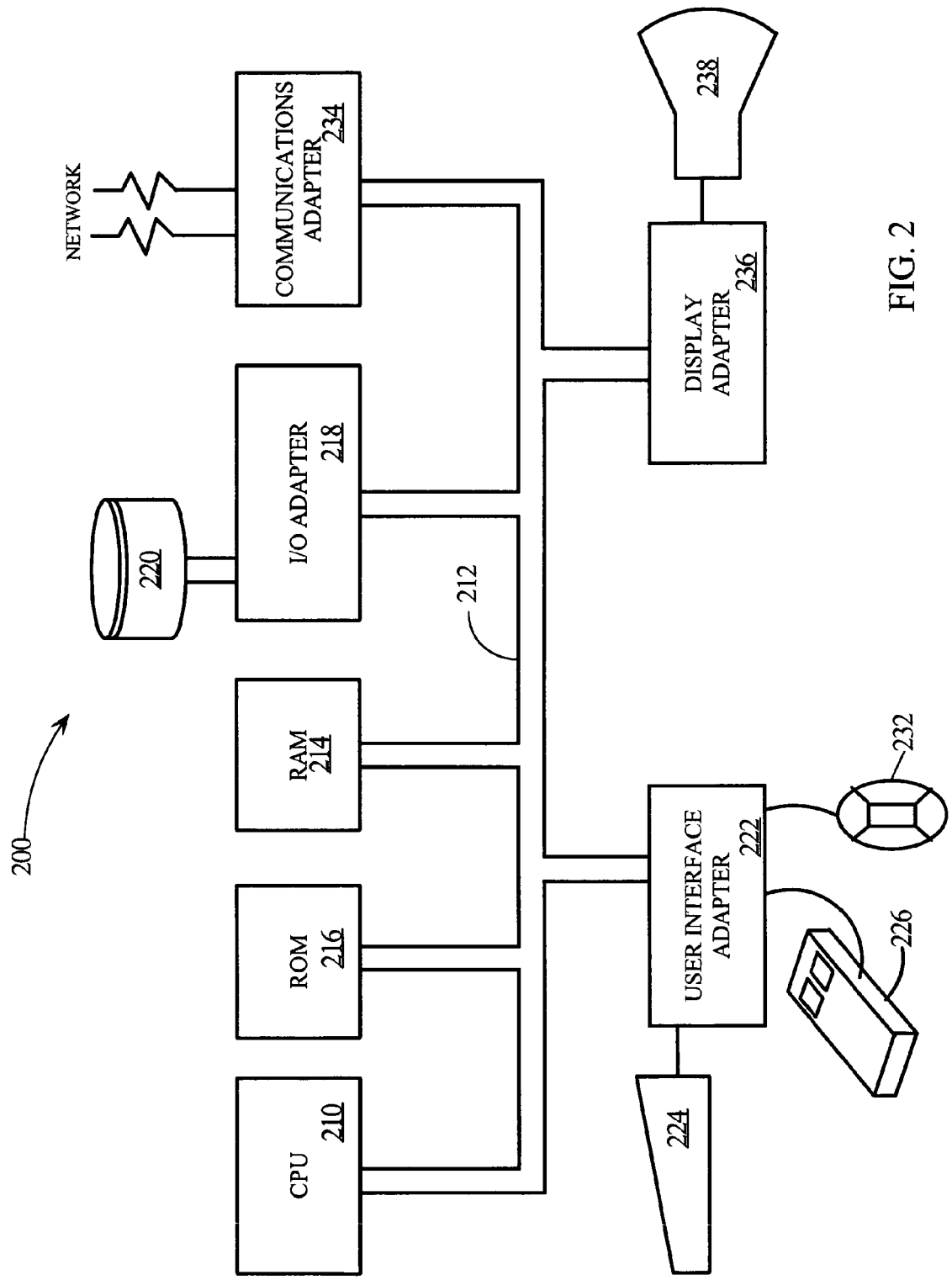
FIG. 2 illustrates, in block diagram form, a data processing system in accordance with another embodiment of the present invention.

FIG. 2 illustrates an exemplary hardware configuration of data processing system 200 in accordance with the subject invention. The system in conjunction with the methodology illustrated in FIG. 1 may be used, to merge topically related e-mail in accordance with the present inventive principles. Data processing system 200 includes central processing unit (CPU) 210, such as a conventional microprocessor, and a number of other units interconnected via system bus 212. Data processing system 200 also includes random access memory (RAM) 214, read only memory (ROM) 216 and input/output (I/O) adapter 218 for connecting peripheral devices such as disk units 220 to bus 212, user interface adapter 222 for connecting keyboard 224, mouse 226, trackball 232 and/or other user interface devices such as a touch screen device (not shown) to bus 212. System 200 also includes communication adapter 234 for connecting data processing system 200 to a data processing network, enabling the system to communicate with other systems, and display adapter 236 for connecting bus 212 to display device 238. CPU 210 may include other circuitry not shown herein, which will include circuitry commonly found within a microprocessor, e.g. execution units, bus interface units, arithmetic logic units, etc. CPU 210 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. These sets of instructions, in conjunction with system components that execute them may merge topically related e-mail into a collated file, or document, as described hereinabove. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for collating e-mail comprising:
    (a) differencing at least one first e-mail message and a second e-mail message wherein said at least one first e-mail message is prior to said second e-mail message, said differencing generating a set of unmatched text and a set of matched text;
    (b) matching said set of matched text against a collated message file, said matching step identifying a position in said collated message file at an end of a portion of said collated message file corresponding to said set of matched text; and
    (c) inserting said set of unmatched text in said collated message file at said position;
    wherein said at least one first e-mail message and said second e-mail message comprise a set of topically-related e-mail selected in response to a preselected pattern in a header portion of each e-mail of said set of topically-related e-mail;
    (d) searching each e-mail message of said set of topically-related e-mail for at least one member of a preselected set of prepended identifiers;
    (e) if said at least one at least one member of a preselected set of prepended identifiers matches a portion of said message of said set of topically-related messages:
        (i) selecting a portion of said message not having said prepended identifier;
        (ii) inserting said portion from substep (i) into said collated message file at a position following a portion matching a set of text having said at least one member of a preselected set of prepended identifiers; and
        (iii) bypassing steps (a)-(c).

2. The method of claim 1 further comprising:
    (f) extracting said set of text having said at least one member of a preselected set of prepended identifiers;
    (g) stripping said at least one member of a preselected set of prepended identifiers from said set of text; and
    (h) matching a set of text from step (g) against said collated message file, wherein said position in substep (e)(ii) comprises a position at an end of a portion of said collated message file matching a set of text from step (g).

3. The method of claim 1 wherein said step of searching each e-mail message of said set of topically-related e-mail comprises searching each e-mail in chronological order of said set of topically-related e-mail.

* * * * *